United States Patent
Reid

(10) Patent No.: US 9,330,612 B2
(45) Date of Patent: May 3, 2016

(54) ELECTROFLUIDIC DISPLAY PIXELS

(71) Applicant: Robert Reid, Henderson, NV (US)

(72) Inventor: Robert Reid, Henderson, NV (US)

(*) Notice: Subject to any disclaimer, the term of this patent is extended or adjusted under 35 U.S.C. 154(b) by 0 days.

(21) Appl. No.: 14/324,170

(22) Filed: Jul. 5, 2014

(65) Prior Publication Data

US 2015/0009244 A1     Jan. 8, 2015

Related U.S. Application Data

(60) Provisional application No. 61/843,411, filed on Jul. 7, 2013.

(51) Int. Cl.
*G09G 3/34*     (2006.01)
*G02B 26/00*     (2006.01)

(52) U.S. Cl.
CPC .............. *G09G 3/348* (2013.01); *G02B 26/005* (2013.01); *G09G 2300/0452* (2013.01); *G09G 2300/0473* (2013.01)

(58) Field of Classification Search
CPC .................. G09G 3/344; G09G 3/348; G09G 2300/0473; G02B 26/005; G02F 1/167
See application file for complete search history.

(56) References Cited

U.S. PATENT DOCUMENTS

| | | | |
|---|---|---|---|
| 7,401,758 B2 | 7/2008 | Liang et al. | |
| 8,111,465 B2 | 2/2012 | Heikenfeld et al. | |
| 8,279,166 B2 | 10/2012 | Huitema et al. | |
| 2008/0093220 A1* | 4/2008 | Cernasov et al. | 204/601 |
| 2010/0294344 A1 | 11/2010 | Huang | |
| 2011/0007056 A1 | 1/2011 | Huitema | |
| 2011/0316764 A1* | 12/2011 | Parry-Jones et al. | 345/60 |
| 2012/0154886 A1* | 6/2012 | Heikenfeld et al. | 359/228 |
| 2012/0168309 A1 | 7/2012 | Heikenfeld et al. | |
| 2013/0033476 A1 | 2/2013 | Dean et al. | |
| 2013/0271816 A1* | 10/2013 | Shim et al. | 359/290 |
| 2013/0342890 A1* | 12/2013 | Shim et al. | 359/290 |
| 2014/0185127 A1* | 7/2014 | Fike et al. | 359/290 |
| 2015/0085342 A1* | 3/2015 | Manukyan et al. | 359/290 |

OTHER PUBLICATIONS

Yang, Shu; Highly Reflective Multi-Stable Electrofluidic Display Pixels; Division of Research and Advanced Studies of the University of Cincinnati (Jan. 30, 2012) (available at https://etd.ohiolink.edu/letd.send_file?accession=ucin1329510668&disposition=inline).

Feenstra, Johan and Hayes, Rob; Electrowetting Displays (May 2009) (available at http://www.liquavista.com/media/772/LQV0905291LL5-15.pdf).

http://www.engadget.com/2008/10/29/kent-displays-develops-paper-thin-electronic-skin-for-mobiles/ (visited Apr. 30, 2013).

http://www.engadget.com/2009/12/10/philips-develops-color-e-paper-wants-to-skin-your-gadgets-with/ (visited Apr. 30, 2013).

Cherry, Stuart; Password; Smart Skins (Nov. 2009) (available at http://www.research.philips.com/password/download/pw36_smart_skins.pdf).

http://www.energyharvestingjournal.com/articles/philips-research-holst-centre-imec-on-autonomous-smart-windows-00003045.asp?sessionid=1 (visited Apr. 30, 2013).

(Continued)

*Primary Examiner* — Lixi C Simpson

(57) ABSTRACT

A device cover includes a protective layer and a display layer. The display layer includes a plurality of display pixels. Each display pixel includes a first fluid having a first color characteristic and a second fluid having a second color characteristic.

18 Claims, 8 Drawing Sheets

(56) References Cited

OTHER PUBLICATIONS

Yang et al.; Journal of the SID; Electrofluidic displays: Fundamental platforms and unique performance attributes, pp. 608-613 (2011).

Mao, Leidong et al; Physical Review B 84, Direct observation of closed-loop ferrodynamic pumping under traveling magnetic fields, pp. 104431-1-104431-7 (2011).

* cited by examiner

ELECTROFLUIDIC DISPLAY PIXELS

BACKGROUND OF THE INVENTION

The present application relates generally to display systems and, more particularly, to electrofluidic display pixels usable in displays and display systems.

Mobile devices, such as cell phones, tablet computing devices, and laptops, are ubiquitous in today's society. Since mobile devices are used in a variety of environments, the devices may experience significant wear and tear, and may also be damaged as a result of being dropped, scratched, and the like. To prevent such damage, users of the devices often place a cover, case, or other protective material over at least a portion of the device. For example, cell phone users often place a protective cover on the cell phones to reduce a likelihood of the cell phones being damaged.

Users of mobile devices often wish to customize or personalize their devices. Accordingly, some users select covers or cases that have a particular color or design that appeals to the users. If the users want to change the color or design on the cover, the users typically must buy a new cover having the desired color or design. However, if the users want to frequently change the color or design for their mobile devices, the costs and burden of buying new covers may be prohibitive. Accordingly, users may be forced to choose between spending significant amounts of money on different covers, or foregoing the opportunity to fully customize the look of the mobile devices by only buying one or a few covers with selected colors or images.

BRIEF DESCRIPTION OF THE INVENTION

In one embodiment, a device cover includes a protective layer and a display layer. The display layer includes a plurality of display pixels. Each display pixel includes a first fluid having a first color characteristic and a second fluid having a second color characteristic.

In another embodiment, a display pixel includes a first fluid channel including a first fluid that causes a first color to be displayed to a viewer, and a second fluid channel including a second fluid that causes a second color to be displayed to the viewer. The display pixel also includes a third fluid channel including a third fluid that causes a third color to be displayed to the viewer, and at least one circuit element configured to transport the first fluid, the second fluid, and the third fluid through the display pixel.

DETAILED DESCRIPTION OF THE INVENTION

Display pixels described herein may be used to display full color images to a user while using substantially less power than other known technologies. Each display pixel may be addressed and/or controlled to display a selectable color or combination of colors, for example, to reproduce desired text and/or images. In addition, as described herein, display pixels are multistable display elements that only require power to switch from one color to another color. Accordingly, the display pixels may be used in a variety of devices and embodiments to display vibrant color and to maintain the displayed color without consuming power. Therefore, the display pixels may maintain the displayed color or colors for days, weeks, or longer without using power.

The display pixels may be combined together in an array, sheet, or other arrangement to provide a display layer. The display layer may be disposed on top of, beneath, or between other suitable layers of material to provide a cover or a skin for one or more devices. For example, the display layer may be disposed between one or more layers of transparent thermoplastic polyurethane (TPU) or another protective transparent material to form a protective cover or skin for a mobile device, such as a cell phone or a tablet computing device. It should be recognized that the display pixels and the display elements formed by the display pixels may be used in any suitable display or cover as desired. For example, the display pixels may be used in an e-reader or a tablet, an electric sign, a billboard, a wallpaper, a presentation board, and the like.

Figure 1:
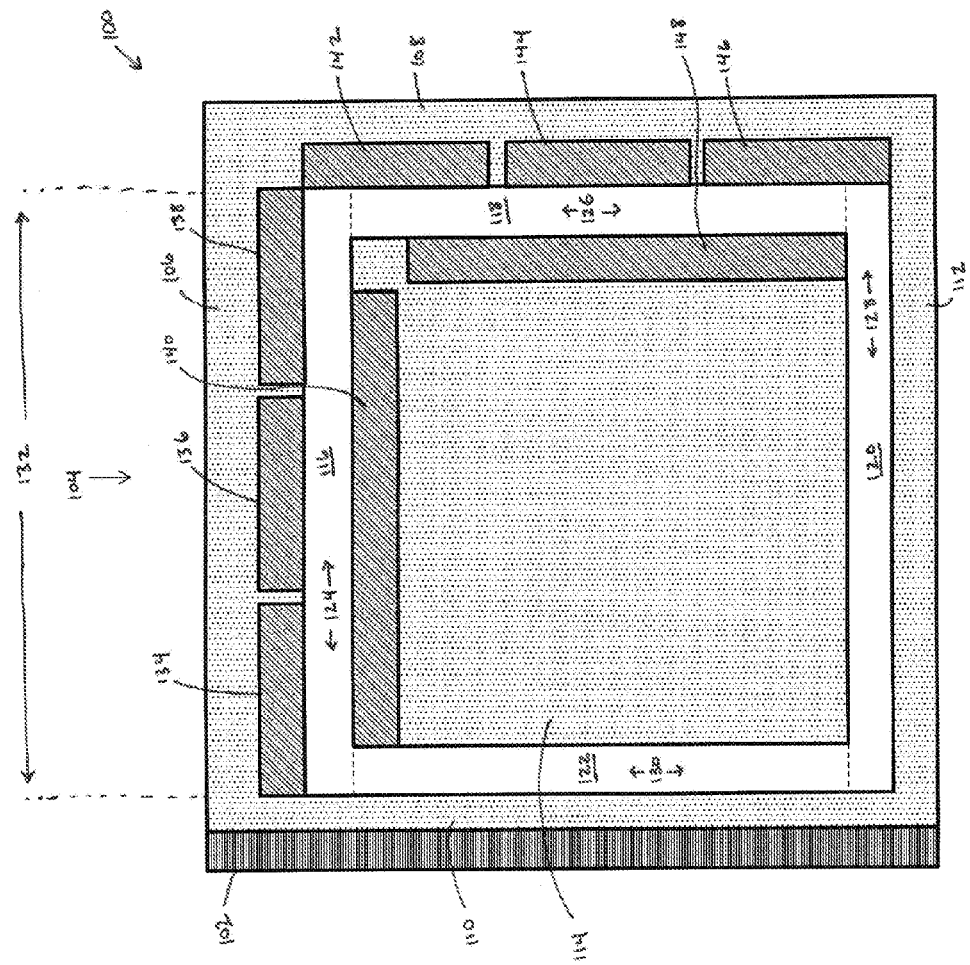
FIG. 1 is a side view of an exemplary display pixel.

FIG. 1 is a side cross-sectional view of an exemplary display pixel 100. In an exemplary embodiment, display pixel 100 uses electrofluidic technology to achieve bistable or multistable display of one or more selected colors. Accordingly, display pixel 100 may sometimes be referred to as an electrofluidic pixel or cell.

In an exemplary embodiment, display pixel 100 includes one or more support structures 102. While one support structure 102 is illustrated in FIG. 1 (i.e., on the left side of display pixel 100), it should be recognized that additional support structures 102 may be included, such as a support structure 102 on the right side of display pixel 100. Alternatively, display pixel 100 may not include a support structure 102. Support structure 102 provides support to display pixel 100 to prevent or reduce an amount of deformation that may otherwise occur if display pixel 100 is compressed or otherwise subjected to force in a vertical direction. For example, if a plurality of display pixels 100 is incorporated into a cover or a skin for a mobile device, support structures 102 of display pixels 100 may provide impact resistance and may protect components of display pixel 100 from impact. Support structure 102 may be manufactured from a thermoplastic material, a silicon material, or any other suitable material that resists compression in the vertical direction. As used herein, the term "vertical direction" refers to a direction substantially aligned with a direction of view 104 of a viewer observing display pixel 100.

Display pixel 100 includes one or more sections or walls, such as a top wall 106 (sometimes referred to as a topstrate), a right wall 108, a left wall 110, and a bottom wall 112 (sometimes referred to as a substrate). An inner structure 114 may also be included within display pixel 100. In addition, a plurality of fluid channels is defined within display pixel 100 for transporting one or more fluids. More specifically, in an exemplary embodiment, a first or top fluid channel 116, a second or right fluid channel 118, a third or bottom fluid channel 120, and a fourth or left fluid channel 122 are defined within display pixel 100 for transporting a first fluid 124, a second fluid 126, a third fluid 128, and a fourth fluid 130, respectively, through display pixel 100. Alternatively, any suitable number of fluid channels are defined within display pixel 100 and/or any suitable number of fluids may be transported by the fluid channels.

In an exemplary embodiment, each wall may be manufactured form a suitable material that is at least partially flexible to enable display pixel 100 to be flexed without damaging display pixel 100. In addition, top wall 106 is transparent to enable light to pass through top wall 106 into first fluid channel 116. Inner structure 114 may be manufactured from the same material as the material used for walls, or any other suitable material.

In an exemplary embodiment, each of the fluids has approximately the same volume but has a different color characteristic (i.e., reflects light of different wavelengths) as compared to each other fluid. Alternatively, one or more of the fluids may be substantially clear or transparent in color such that the fluid does not provide a recognizable color to the viewer (i.e., the fluid may have a transparent color characteristic). In an exemplary embodiment, first fluid 124, second fluid 126, third fluid 128, and fourth fluid 130 cooperate to present at least a portion of a subtractive color scheme to the viewer within a viewable area 132 of display pixel 100. For example, first fluid 124 may have a cyan color characteristic to present a cyan color to the viewer, second fluid 126 may have a magenta color characteristic to present a magenta color to the viewer, third fluid 128 may have a yellow color characteristic to present a yellow color to the viewer, and fourth fluid 130 may have a white or a black color characteristic to present a white or black color, respectively, to the viewer. Alternatively, fourth fluid 130 may be transparent and an electrode or other circuit element or portion of display pixel 100 that is viewable by the viewer may be colored white or black as desired. Accordingly, in an exemplary embodiment, the fluids of display pixel 100 and/or one or more electrodes of display pixel 100 may cooperate to form a CMY or a CMYK color scheme. It should be recognized that 4 display pixels 100, or another number of display pixels 100, may be grouped together to form the desired color scheme, with each of the grouped display pixels 100 providing a portion of the desired color for a viewing area. Alternatively, the fluids and/or the electrodes (or other portions of display pixel 100) may cooperate to form any other suitable color scheme.

In an exemplary embodiment, two of the fluids are water-based and two of the fluids are oil-based, with appropriate dyes or colored particulates disposed in each fluid to obtain the desired colors for the selected color scheme. The fluids are positioned within the fluid channels such that each water-based fluid is separated by an oil-based fluid and each oil-based fluid is separated by a water-based fluid. Accordingly, the fluids alternate between water-based and oil-based within the fluid channels. For example, first fluid channel 116 may include a water-based first fluid 124, second fluid channel 118 may include an oil-based second fluid 126, third fluid channel 120 may include a water-based third fluid 128, and fourth fluid channel 122 may include an oil-based fourth fluid 130. As water-based fluids and oil-based fluids are substantially immiscible, the fluids are prevented from mixing under normal operating conditions. The inner surfaces of the fluid channels are coated with a hydrophobic dielectric material to enable the fluids to be controlled and moved using electrowetting principles as described more fully herein.

In an alternative embodiment, two fluids (e.g., first fluid 124 and third fluid 128) are ionic fluids and the other two fluids (e.g., second fluid 126 and fourth fluid 130) are non-ionic fluids. The ionic fluids may include, without limitation, one or more salts or salt-like chemicals that are liquid at room temperature. The non-ionic fluids may include, without limitation, water or oil, for example. However, the non-ionic fluids should be chosen to be immiscible with the ionic fluids, and each fluid should be chosen such that one or more colors may be formed using the fluids. In some embodiments, electrolytic fluids may be used in place of the ionic fluids.

In addition, display pixel 100 includes a plurality of circuit elements, such as a plurality of electrode groups, positioned proximate to the fluid channels. In an exemplary embodiment, a first electrode group includes a first top source electrode 134, a second top source electrode 136, a third top source electrode 138, and a top ground electrode 140. A second electrode group includes a first side source electrode 142, a second side source electrode 144, a third side source electrode 146, and a side ground electrode 148. The first electrode group is positioned about first fluid channel 116 such that first top source electrode 134, second top source electrode 136, and third top source electrode 138 are coupled to top wall 106 and are positioned above first fluid channel 116. Top ground electrode 140 is coupled to inner structure 114 and is positioned below first fluid channel 116. Likewise, the second electrode group is positioned about second fluid channel 118 such that first side source electrode 142, second side source electrode 144, and third side source electrode 146 are coupled to right wall 108 and are positioned to the right of second fluid channel 118. Side ground electrode 148 is coupled to inner structure 114 and is positioned to the left of second fluid channel 118. All directions described herein are in reference to direction of view 104. Alternatively, the electrodes in the first electrode group and/or the second electrode group may be arranged in any suitable position with respect to any of the fluid channels.

In an exemplary embodiment, the electrodes positioned within, or coupled to, top wall 106 are transparent to enable light entering display pixel 100 to pass through the electrodes to the fluid channel (i.e., first fluid channel 116). For example, the top electrodes (first top source electrode 134, second top source electrode 136, and third top source electrode 138 in the example illustrated in FIG. 1) may be manufactured from indium tin oxide or another suitable transparent, conductive material. In addition, the electrode or electrodes positioned within, or coupled to, a top surface of inner structure 114 (i.e., top ground electrode 140 in the example illustrated in FIG. 1) is reflective to reflect any light passing through the fluid in first fluid channel 116 back to the viewer. For example, top ground electrode 140 may be manufactured from aluminum or another suitable reflective, conductive material. Accordingly, if the fluid in first fluid channel 116 is transparent, display pixel 100 will appear white as most of the light passes through the top electrodes and the fluid in first fluid channel without being absorbed, and the light is reflected back to the viewer by top ground electrode 140. However, if the fluid in first fluid channel 116 is colored, display pixel 100 will appear to have the color of the fluid as only light having the perceived color of the fluid will be reflected back towards the viewer. While top ground electrode 140 is described as being reflective herein, it should be recognized that top ground electrode 140 may be colored with any suitable color to complement the color scheme selected for display pixel 100.

While 3 source electrodes are displayed for the first electrode group and 3 source electrodes are displayed for the second electrode group, it should be recognized that any suitable number of source electrodes may be used for the first electrode group and the second electrode group. In addition, while four fluid channels are displayed for transporting four fluids, it should be recognized that any suitable number of fluids and/or fluid channels may be used. For example, two or more fluids may be positioned in each fluid channel, or in any number of fluid channels.

Likewise, while two electrode groups are shown (i.e., the first electrode group and the second electrode group), it should be recognized that additional groups of electrodes may be used within display pixel 100. For example, using additional groups of electrodes may enable display pixel 100 to transport additional fluids, or fluids with different properties.

In addition, the two groups of electrodes may be positioned in alternative locations with respect to fluid channels. For example, the first electrode group may be positioned about third fluid channel 120 (i.e., at the bottom of display pixel 100) and/or the second electrode group may be positioned about fourth fluid channel 122 (i.e., at the left side of display pixel 100). Likewise, the position of source and ground electrodes may be switched such that ground electrodes are positioned along the outer surface of the fluid channels (i.e., within or coupled to top wall 106 for top ground electrode 140 and within or coupled to right wall 108 for side ground electrode 148) and the source electrodes are positioned along the inner surface of the fluid channels (i.e., within or coupled to inner structure 114).

While top ground electrode 140 and side ground electrode 148 are shown as being separate from each other in FIG. 1, in one embodiment, top ground electrode 140 and side ground electrode 148 may be coupled together or may be formed as a single unitary ground electrode.

During operation, display pixel 100 may be used to display a portion, such as a colored pixel, of a larger color image and/or text. A viewer may look at display pixel 100 along direction of view 104. As display pixel 100 is controlled as described herein, a selected or controllable color is displayed to, or perceived by, the viewer.

The fluids in display pixel 100 are moved using electrowetting principles. More specifically, a voltage applied across a source electrode and a ground electrode provides a charge along the source electrode that changes the hydrophobicity of the dielectric material along the source electrode. Accordingly, a water-based fluid proximate to the source electrode is attracted to the source electrode by electrowetting principles known in the art.

Therefore, in an example in which first fluid 124 and third fluid 128 are water-based fluids, and second fluid 126 and fourth fluid 130 are oil-based fluids, the water-based fluids may be attracted to source electrodes by applying a voltage across the top source electrodes and the opposing ground electrode. For example, applying a voltage across top ground electrode 140 and each of first top source electrode 134, second top source electrode 136, and third top source electrode 138 causes first fluid 124 to move into first fluid channel 116. Since first fluid 124 is immiscible with second fluid 126 and fourth fluid 130, the movement of first fluid 124 into first fluid channel 116 causes second fluid 126 to enter second fluid channel 118 and causes fourth fluid 130 to move into fourth fluid channel 122. Similarly, the immiscibility of third fluid 128 with respect to second fluid 126 and fourth fluid 130 causes third fluid 128 to move into third fluid channel 120. Since first fluid 124 fills viewable area 132, the viewer observes display pixel 100 as having the color of first fluid 124.

If it is desirable to cause display pixel 100 to display the color of fourth fluid 130, for example, first fluid 124 may be moved into second fluid channel 118 to cause second fluid 126 to enter third fluid channel 120, third fluid 128 to enter fourth fluid channel 122, and fourth fluid 130 to enter first fluid channel 116. A first step of moving first fluid 124 into second fluid channel 118 (and thereby moving fourth fluid into first fluid channel 116) includes deactivating (i.e., removing a voltage from) first top source electrode 134 and by activating (i.e., applying a voltage to) second top source electrode 136, third top source electrode 138, and first side source electrode 142. This first step causes first fluid 124 to partially move towards second fluid channel 118 and become substantially aligned with second top source electrode 136, third top source electrode 138, and first side source electrode 142. At this point, fourth fluid 130 fills approximately ⅓ of viewable area 132 (the area under first top source electrode 134) and first fluid 124 fills the remaining ⅔ of viewable area 132 (the area under second top source electrode 136 and third top source electrode 138).

A second step of the movement of fourth fluid 130 into first fluid channel 116 includes deactivating second top source electrode 136 and activating third top source electrode 138, first side source electrode 142, and second side source electrode 144 to cause first fluid 124 to move into alignment with third top source electrode 138, first side source electrode 142, and second side source electrode 144. At this point, fourth fluid 130 fills approximately ⅔ of viewable area 132 (the area under first top source electrode 134 and second top source electrode 136) and first fluid 124 fills the remaining ⅓ of viewable area 132 (the area under third top source electrode 138).

A third and final step of the movement of fourth fluid 130 into first fluid channel 116 includes deactivating third top source electrode 138 and activating first side source electrode 142, second side source electrode 144, and third side source electrode 146 such that first fluid 124 moves into alignment with first side source electrode 142, second side source electrode 144, and third side source electrode 146. At this point, fourth fluid 130 fills viewable area 132 (i.e., the area under first top source electrode 134, second top source electrode 136, and third top source electrode 138) such that display pixel 100 presents the color of fourth fluid 130 to the viewer. It should be recognized that since second fluid 126 and fourth fluid 130 are oil-based fluids, second fluid 126 and fourth fluid 130 are not able to be moved directly by the electrowetting principles described herein. Rather, second fluid 126 and fourth fluid 130 are moved indirectly as a result of the interstitial pressures exerted on the fluids by first fluid 124 and third fluid 128 as first fluid 124 and/or third fluid 128 are acted upon by the electrodes. The three step process described above may be used to ensure that first fluid 124 is moved into second fluid channel 128 by the second group of electrodes, rather than third fluid 128 being moved into second fluid channel 128.

Third fluid 128 may be moved into first fluid channel 116 using similar mechanisms. More specifically, the first step of the movement of third fluid 128 into first fluid channel 116 includes activating first top source electrode 134 (while second top source electrode 136 and third top source electrode 138 are deactivated) and activating second side source electrode 144 and third side source electrode 146 (while first side source electrode 142 is deactivated). The activation of first top source electrode 134 (and the deactivation of second top source electrode 136 and third top source electrode 138), along with the activation of second side source electrode 144 and third side source electrode 146 (and the deactivation of first side source electrode 142), causes third fluid 128 to be drawn towards first fluid channel 116 rather than first fluid 124 being drawn back into first fluid channel 116. Accordingly, first fluid 124 is drawn towards an intersection of second fluid channel 118 and third fluid channel 120, and third fluid 128 is drawn towards an intersection of fourth fluid channel 122 and first fluid channel 116. At this point, third fluid 128 fills approximately ⅓ of viewable area 132 (the area under first top source electrode 134) and fourth fluid 130 fills the remaining ⅔ of viewable area 132 (the area under second top source electrode 136 and third top source electrode 138).

The second step of the movement of third fluid 128 into first fluid channel 116 includes activating first top source electrode 134 and second top source electrode 136 (while third top source electrode 138 is deactivated) and activating third side source electrode 146 (while first side source electrode 142 and second side source electrode 144 are deactivated). At this point, third fluid 128 fills approximately ⅔ of viewable area 132 (the area under first top source electrode 134 and second top source electrode 136) and fourth fluid 130 fills the remaining ⅓ of viewable area 132 (the area under third top source electrode 138).

The third and final step of the movement of third fluid 128 into first fluid channel 116 includes activating first top source electrode 134, second top source electrode 136 and third top source electrode 138 while first side source electrode 142, second side source electrode 144, and third side source electrode 146 are deactivated. At this point, third fluid 128 fills viewable area 132 (i.e., the area under first top source electrode 134, second top source electrode 136, and third top source electrode 138) such that display pixel 100 presents the color of third fluid 128 to the viewer.

Finally, second fluid 126 may be moved into first fluid channel 116 using similar mechanisms. More specifically, the first step of moving second fluid 126 into first fluid channel 116 (i.e, by moving third fluid 128 into second fluid channel 118) includes deactivating first top source electrode 134 and by activating second top source electrode 136, third top source electrode 138, and first side source electrode 142. This first step causes third fluid 128 to partially move towards second fluid channel 118 and become substantially aligned with second top source electrode 136, third top source electrode 138, and first side source electrode 142. At this point, second fluid 126 fills approximately ⅓ of viewable area 132 (the area under first top source electrode 134) and third fluid 128 fills the remaining ⅔ of viewable area 132 (the area under second top source electrode 136 and third top source electrode 138).

A second step of the movement of second fluid 126 into first fluid channel 116 includes deactivating second top source electrode 136 and activating third top source electrode 138, first side source electrode 142, and second side source electrode 144 to cause third fluid 128 to move into alignment with third top source electrode 138, first side source electrode 142, and second side source electrode 144. At this point, second fluid 126 fills approximately ⅔ of viewable area 132 (the area under first top source electrode 134 and second top source electrode 136) and third fluid 128 fills the remaining ⅓ of viewable area 132 (the area under third top source electrode 138).

A third and final step of the movement of second fluid 126 into first fluid channel 116 includes deactivating third top source electrode 138 and activating first side source electrode 142, second side source electrode 144, and third side source electrode 146 such that third fluid 128 moves into alignment with first side source electrode 142, second side source electrode 144, and third side source electrode 146. At this point, second fluid 126 fills viewable area 132 (i.e., the area under first top source electrode 134, second top source electrode 136, and third top source electrode 138) such that display pixel 100 presents the color of second fluid 126 to the viewer.

If desired, each fluid may only be partially moved into first fluid channel 116 to enable a mix of colors to be displayed. For example, fourth fluid 130 may be moved into first fluid channel 116 to align with first top source electrode 134 while first fluid 124 remains aligned with second top source electrode 136 and third top source electrode 138. In such a manner, the color displayed to the viewer would be a mixture of ⅓ the color of fourth fluid 130 and ⅔ the color of first fluid 124. Other combinations may be created as desired. In addition, the above description assumes that each electrode is activated with the same voltage. However, different voltages may be applied to the electrodes to vary the degree that first fluid 124 and/or third fluid 128 is drawn towards the electrodes. In such a manner, further control may be provided over the percentages of each color displayed to the viewer. For example, during the first step of the movement of fourth fluid 130 into first fluid channel 116, second top source electrode 136 may have a higher voltage applied than the voltage applied to third top source electrode 138 and first side source electrode 142 to enable a smaller amount of first fluid 124 to enter second fluid channel 118. In such a manner, smaller amounts of fourth fluid 130 may be drawn into first fluid channel 116. Accordingly, different mixtures of colors from first fluid 124 and fourth fluid 130 may be displayed to the viewer, such as a color formed from about 10% of fourth fluid 130 and about 90% of first fluid 124, or about 25% of fourth fluid 130 and about 75% of first fluid 124, for example. The other fluids of display pixel 100 may be controlled in a similar manner as described herein.

It should be recognized that display pixel 100 is multistable in operation. For example, if power is removed from display pixel 100, the fluids remain in their positions due to the substantially balanced interstitial forces and surface tensions within each fluid channel. Accordingly, voltage may be applied to the electrodes to move the fluids into desired positions within the fluid channels to display the desired color to the viewer, and the voltage may then be removed without affecting or changing the color displayed to the user. As such, a desired color may be provided by display pixel 100, theoretically indefinitely, in the absence of power to display pixel 100.

Figure 2:
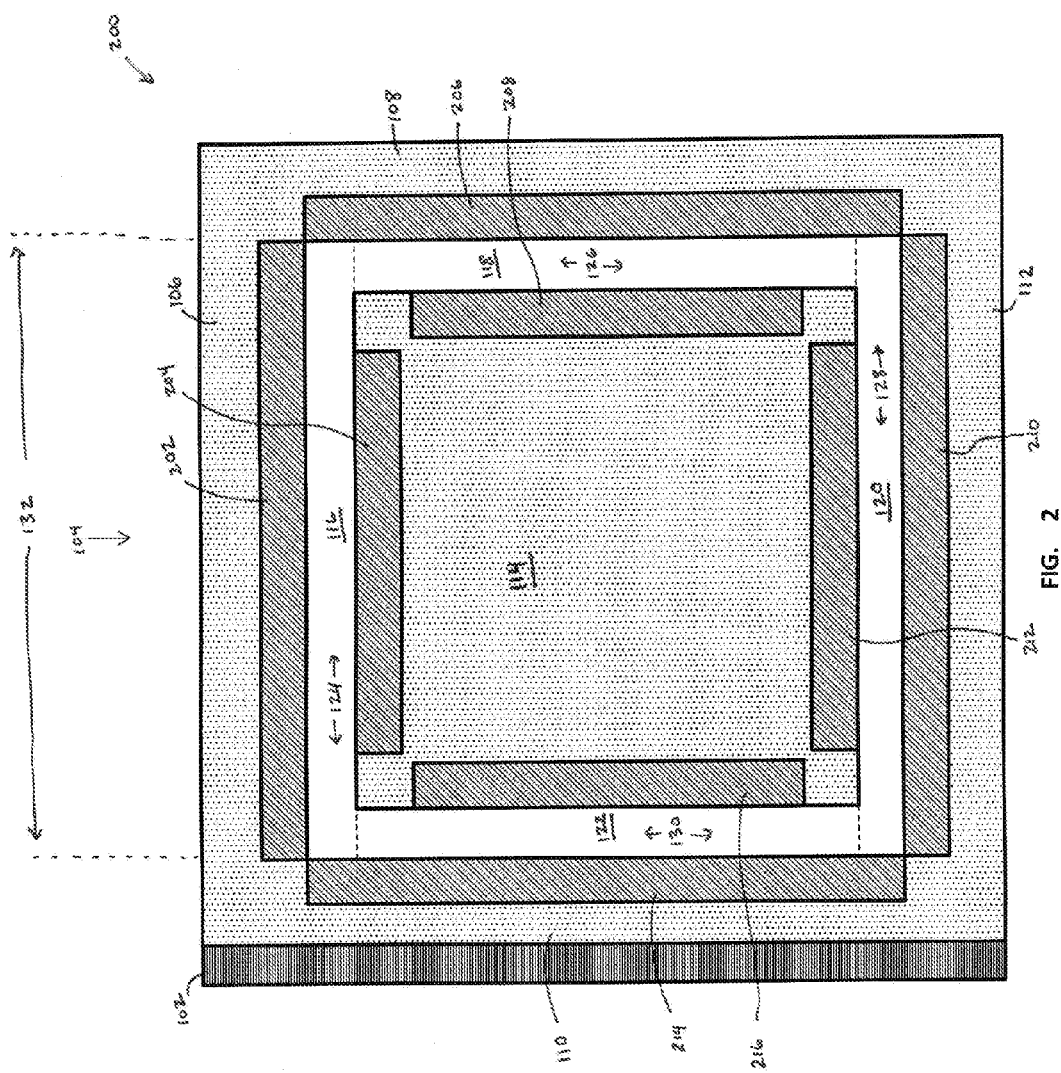
FIG. 2 is a side view of another exemplary display pixel.

FIG. 2 is a side cross-sectional view of an exemplary display pixel 200. Unless otherwise specified, display pixel 200 is similar to display pixel 100 (shown in FIG. 1) and similar components are labeled in FIG. 2 with the same reference numerals used in FIG. 1.

In an exemplary embodiment, display pixel 200 includes 4 groups of electrodes instead of 2 groups of electrodes described in FIG. 1. More specifically, display pixel 200 includes a first group of electrodes, a second group of electrodes, a third group of electrodes, and a fourth group of electrodes.

The first group of electrodes includes a top source electrode 202 and a top ground electrode 204 that are positioned about first fluid channel 116. For example, top source electrode 202 is coupled to, or positioned within, top wall 106 above first fluid channel 116 and top ground electrode 204 is coupled to, or positioned within, a top portion of inner structure 114 beneath first fluid channel 116. The second group of electrodes includes a right source electrode 206 and a right ground electrode 208 that are positioned about second fluid channel 118. For example, right source electrode 206 is coupled to, or positioned within, right wall 108 to the right of second fluid channel 118 and right ground electrode 208 is coupled to, or positioned within, a right portion of inner structure 114 to the left of second fluid channel 118. The third group of electrodes includes a bottom source electrode 210 and a bottom ground electrode 212 that are positioned about third fluid channel 120. For example, bottom source electrode 210 is coupled to, or positioned within, bottom wall 112 below third fluid channel 120 and bottom ground electrode 212 is coupled to, or positioned within, a bottom portion of inner structure 114 above third fluid channel 120. The fourth group of electrodes includes a left source electrode 214 and a left ground electrode 216. For example, left source electrode 214 is coupled to, or positioned within, left wall 110 to the left of fourth fluid channel 122 and left ground electrode 216 is coupled to, or positioned within, a left portion of inner structure 114 to the right of fourth fluid channel 122.

It should be recognized that a position of one or more of the source electrodes may be switched with a position of one or more ground electrodes. Moreover, it should be recognized that one or more of the source electrodes may be split into two or more source electrodes. For example, each of the source electrodes may be split into 3 source electrodes as shown in FIG. 1 or into any number of electrodes.

In an exemplary embodiment, top source electrode 202 is transparent to enable light entering display pixel 200 to pass through the electrodes to the fluid channel (i.e., first fluid channel 116) in a similar manner as described above with reference to FIG. 1. In addition, top ground electrode 204 is reflective to reflect any light passing through the fluid in first fluid channel 116 back to the viewer as described above with reference to FIG. 1, or may have any suitable color.

While the ground electrodes (top ground electrode 204, right ground electrode 208, bottom ground electrode 212, and left ground electrode 216) are shown as being separate from each other in FIG. 1, in one embodiment, one or more of the ground electrodes may be coupled together or may be formed as a single unitary ground electrode.

During operation, display pixel 200 may be used to display a portion, such as a colored pixel, of a larger color image in a similar manner as described with reference to FIG. 1. The following operation of display pixel 200 is based on first fluid 124 initially being positioned within first fluid channel 116 such that the color of first fluid 124 is displayed or provided to the viewer.

If it is desirable to cause display pixel 200 to display the color of fourth fluid 130, for example, first fluid 124 may be moved into second fluid channel 118 to cause second fluid 126 to enter third fluid channel 120, third fluid 128 to enter fourth fluid channel 122, and fourth fluid 130 to enter first fluid channel 116. A first step of moving first fluid 124 into second fluid channel 118 (and thereby moving fourth fluid into first fluid channel 116) includes activating top source electrode 202 and right source electrode 206 while bottom source electrode 210 and left source electrode 214 are deactivated. This first step causes first fluid 124 to partially move into second fluid channel 118. If the same voltages are used to activate top source electrode 202 and right source electrode 206, first fluid 124 moves about halfway into second fluid channel 118 such that fourth fluid 130 fills approximately ½ of viewable area 132 and first fluid 124 fills the remaining ½ of viewable area 132.

A second step of the movement of fourth fluid 130 into first fluid channel 116 includes deactivating top source electrode 202 (with bottom source electrode 210 and left source electrode 214 remaining deactivated) and activating right source electrode 206 to cause first fluid to move into alignment with right source electrode 206. As a result, fourth fluid 130 the entire area of viewable area 132. As first fluid 124 and third fluid 128 are movable by electrowetting processes in the example described herein, it should be recognized that the two step process may be required to move first fluid 124 into second fluid channel 118 without third fluid 128 inadvertently being moved into second fluid channel 118 instead.

With fourth fluid 130 filling the viewable area 132 (i.e., first fluid channel 116), third fluid 128 may be moved into first fluid channel 116 using a similar two step method as described herein, with the exception that right source electrode 206 and bottom source electrode 210 may be used to move first fluid 124 into bottom fluid channel 120 to cause third fluid 128 to move into first fluid channel 116. Likewise, once third fluid 128 is moved into first fluid channel 116 to fill the viewable area 132, second fluid 126 may be moved into first fluid channel 116 using the same two step method as described with respect to the movement of fourth fluid 130 into first fluid channel 116.

Additionally or alternatively, other source electrodes may be used to move the fluids into different fluid channels. For example, while fourth fluid 130 is described as being moved into first fluid channel 116 by moving first fluid 124 into second fluid channel 118 using top source electrode 202 and right source electrode 206, it should be recognized that fourth fluid 130 may be additionally or alternatively moved into first fluid channel 116 by acting on third fluid 128 using bottom source electrode 210 and left source electrode 214.

If desired, each fluid may only be partially moved into first fluid channel 116 to enable a mix of colors to be displayed. For example, different voltages may be applied to the electrodes to vary the degree that first fluid 124 and/or third fluid 128 is drawn towards the electrodes in a similar manner as described above with reference to FIG. 1.

Figure 3:
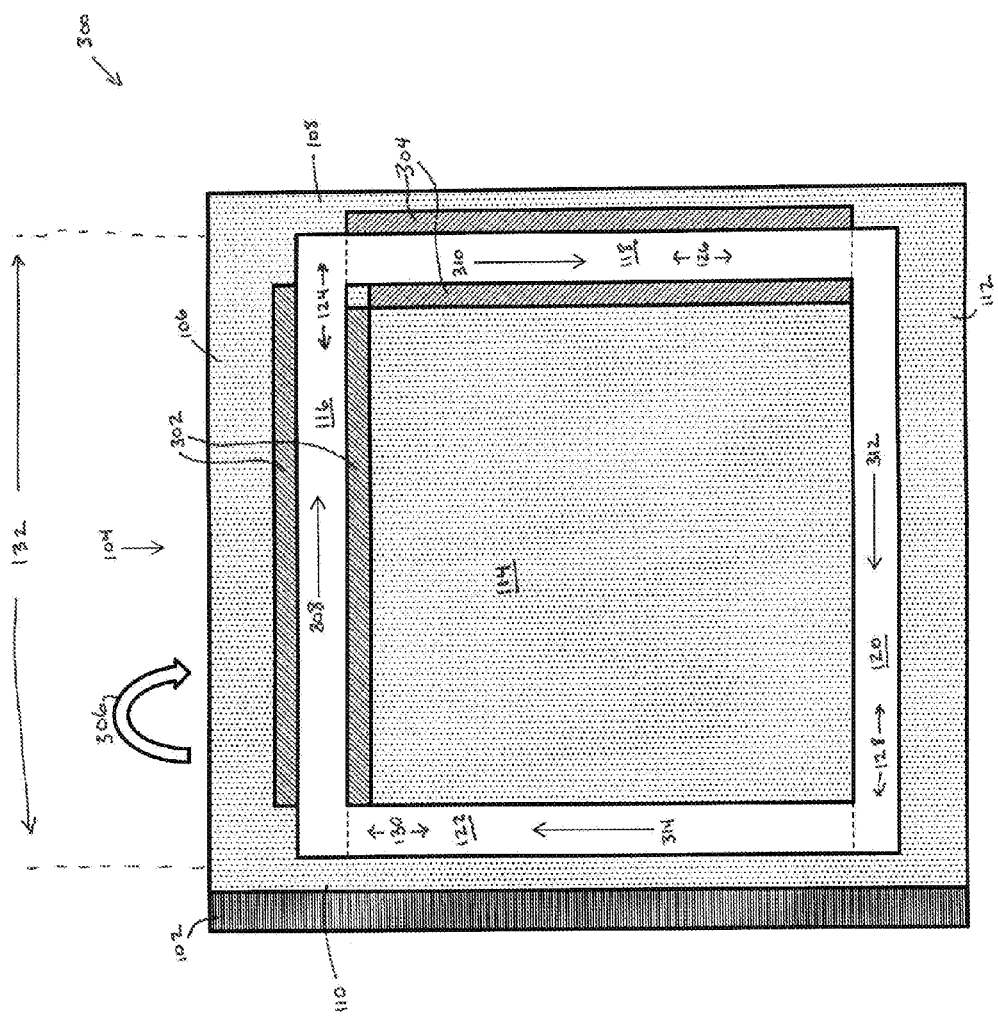
FIG. 3 is a side view of another exemplary display pixel.

FIG. 3 is a side cross-sectional view of an exemplary display pixel 300. Unless otherwise specified, display pixel 300 is similar to display pixel 100 (shown in FIG. 1) and similar components are labeled in FIG. 3 with the same reference numerals used in FIG. 1.

In an exemplary embodiment, display pixel 300 includes a plurality of circuit elements that are different than the circuit elements used in FIG. 1 to move the fluids through the fluid channels. More specifically, display pixel 300 includes 2 conductive coils instead of 2 groups of electrodes described in FIG. 1. More specifically, display pixel 300 includes a first coil 302 and a second coil 304. First coil 302 is coupled to, or positioned within, top wall 106 and a top portion of inner structure 114, and is positioned about first fluid channel 116 to encircle at least a portion of first fluid channel 116. Second coil 304 is coupled to, or positioned within, right wall 108 and a right portion of inner structure 114, and is positioned about second fluid channel 118 to encircle at least a portion of second fluid channel 118.

It should be recognized that first coil 302 and/or second coil 304 may be positioned about a different fluid channel, such as third fluid channel 120 or fourth fluid channel 122. Moreover, it should be recognized that first coil 302 and/or second coil 304 may be split into two or more coils for positioning about one or more fluid channels. Alternatively, one or more coils may be used in addition to first coil 302 and second coil 304. For example, a separate coil may be positioned about each of first fluid channel 116, second fluid channel 118, third fluid channel 120, and fourth fluid channel 122. In another embodiment, only one coil, such as first coil 302 or second coil 304, may be used.

In an exemplary embodiment, first coil 302 is transparent to enable light entering display pixel 300 to pass through first coil 302 to first fluid channel 116 in a similar manner as described above with reference to FIG. 1. For example, first coil 302 and/or second coil 304 may be manufactured from the same materials used to manufacture the electrodes described in FIG. 1, or may be manufactured from any suitable conductive, transparent material. In addition, a reflective coating may be provided on a top surface of inner structure 114 to reflect light passing through the fluid in first fluid channel 116 back to the viewer as described above with reference to FIG. 1.

First coil 302 and second coil 304 move the fluids through fluid channels using induced magnetic fields as described more fully herein. For example, one or more fluids may be ferrofluids or other fluids that become polarized in the presence of a magnetic field. A magnetic field generated or induced by electrical current flowing through first coil 302 and/or second coil 304 causes movement of the fluid in a direction orthogonal to the current as described herein.

During operation, display pixel 300 may be used to display a portion, such as a colored pixel, of a larger color image. The following operation of display pixel 300 is based on first fluid 124 initially being positioned within first fluid channel 116 such that the color of first fluid 124 is displayed or provided to the viewer. First fluid 124 and third fluid 128, in this example, are ferrofluids or other suitable fluids that are movable by magnetic fields generated by first coil 302 and/or second coil 304. Moreover, in this example, second fluid 126 and fourth fluid 130 are oils or oil-based fluids that are substantially resistant to movement by magnetic fields. Alternatively, any of the fluids may be replaced by any other suitable fluid as desired to operate as described herein.

If it is desirable to cause display pixel 300 to display the color of fourth fluid 130, for example, first fluid 124 may be moved into second fluid channel 118 to cause second fluid 126 to enter third fluid channel 120, third fluid 128 to enter fourth fluid channel 122, and fourth fluid 130 to enter first fluid channel 116. More specifically, an electrical current is directed through first coil 302 and optionally through second coil 304 (i.e., first coil 302 and/or second coil 304 are activated). The current flows in a clockwise direction 306 around first coil 302 with reference to a view of first coil 302 along a first flow direction 308. The current flow causes a magnetic field to be induced and directed along first flow direction 308. It should be recognized that a current directed through second coil 304 flows through second coil 304 in a similar manner to induce a magnetic field in a second flow direction 310 substantially orthogonal to first flow direction 308.

The magnetic field induced by first coil 302 causes first fluid 124 to move along first flow direction 308 into second fluid channel 118. An interstitial pressure between first fluid 124 and second fluid 126 causes second fluid 126 to move along second flow direction 310 into third fluid channel 120. An interstitial pressure between second fluid 126 and third fluid 128 causes third fluid 128 to move along a third flow direction 312 into fourth fluid channel 122. Likewise, an interstitial pressure between third fluid 128 and fourth fluid 130 causes fourth fluid 130 to move along a fourth flow direction 314 into first fluid channel 116.

Once first fluid 124 has been fully moved into second fluid channel 118 (and thus, once fourth fluid 130 has been fully moved into first fluid channel 116), first coil 302 may be deactivated (i.e., the current flowing through first coil 302 is removed). Accordingly, at this point, first fluid 124 is positioned within second fluid channel 118, second fluid 126 is positioned in third fluid channel 120, third fluid 128 is positioned within fourth fluid channel 122, and fourth fluid 130 is positioned in first fluid channel 116 such that the color of fourth fluid 130 is displayed to the viewer.

Third fluid 128 may be displayed to the viewer by moving fourth fluid 130 into second fluid channel 118, first fluid 124 into third fluid channel 120, and second fluid 126 into fourth fluid channel 122, thus causing third fluid 128 to be moved into first fluid channel 116. To accomplish this, second coil 304 is activated to cause a magnetic field directed along second flow direction 310. The magnetic field operates on first fluid 124 to cause first fluid 124 to move in second flow direction 310 into third fluid channel 120. The movement of first fluid 124 into third fluid channel 120 causes second fluid 126 to move along third flow direction 312 to enter fourth fluid channel 122, causes third fluid 128 to move along fourth flow direction 314 to enter first fluid channel 116, and causes fourth fluid 130 to move along first flow direction 308 to enter second fluid channel 118. Accordingly, at this point, the color of third fluid 128 is displayed to the viewer.

First coil 302 may be activated to move second fluid 126 into first fluid channel 116 to display the color of second fluid 126 to the viewer. More specifically, the activation of first coil 302 induces a magnetic field that interacts with third fluid 128 and moves third fluid 128 along first flow direction 308 into second fluid channel 118. Fourth fluid 130 is moved into third fluid channel 120 by the interstitial pressure between third fluid 128 and fourth fluid 130. Likewise, first fluid 124 is moved into fourth fluid channel 122 by the interstitial pressure between fourth fluid 130 and first fluid 124. Second fluid 126 is moved into first fluid channel 116 by the interstitial pressure between first fluid 124 and second fluid 126 to cause second fluid 126 to be viewable by the viewer.

First fluid 124 may be returned to first fluid channel 116 in a similar manner. More specifically, second coil 304 is activated to magnetically move third fluid 128 along second flow direction 310 into third fluid channel 120. The interstitial pressure between third fluid 128 and fourth fluid 130 causes fourth fluid 130 to move along third flow direction 312 into fourth fluid channel 122. The interstitial pressure between fourth fluid 130 and first fluid 124 causes first fluid 124 to move along fourth flow direction 314 into first fluid channel 116. Likewise, the interstitial pressure between first fluid 124 and second fluid 126 causes second fluid 126 to move along first flow direction 308 into second fluid channel 118. Once first fluid 124 has fully entered and filled first fluid channel 116, second coil 304 is deactivated and first fluid 124 is displayed to the viewer.

If desired, a fluid may only be partially moved into first fluid channel 116 to enable a mix of colors to be displayed. For example, different voltages may be applied to first coil 302 and second coil 304 to vary the degree that first fluid 124 and/or third fluid 128 is moved along the flow directions described herein. Additionally or alternatively, first coil 302 and/or second coil 304 may be only activated for part of the time required to move a particular fluid into first fluid channel 116. In such an embodiment, the desired fluid may be moved partially into first fluid channel 116 to cause a mix of colors to be displayed to the viewer (i.e., a mix of the color of the desired fluid and of the color of the fluid it partially displaces from first fluid channel 116).

Figure 4:
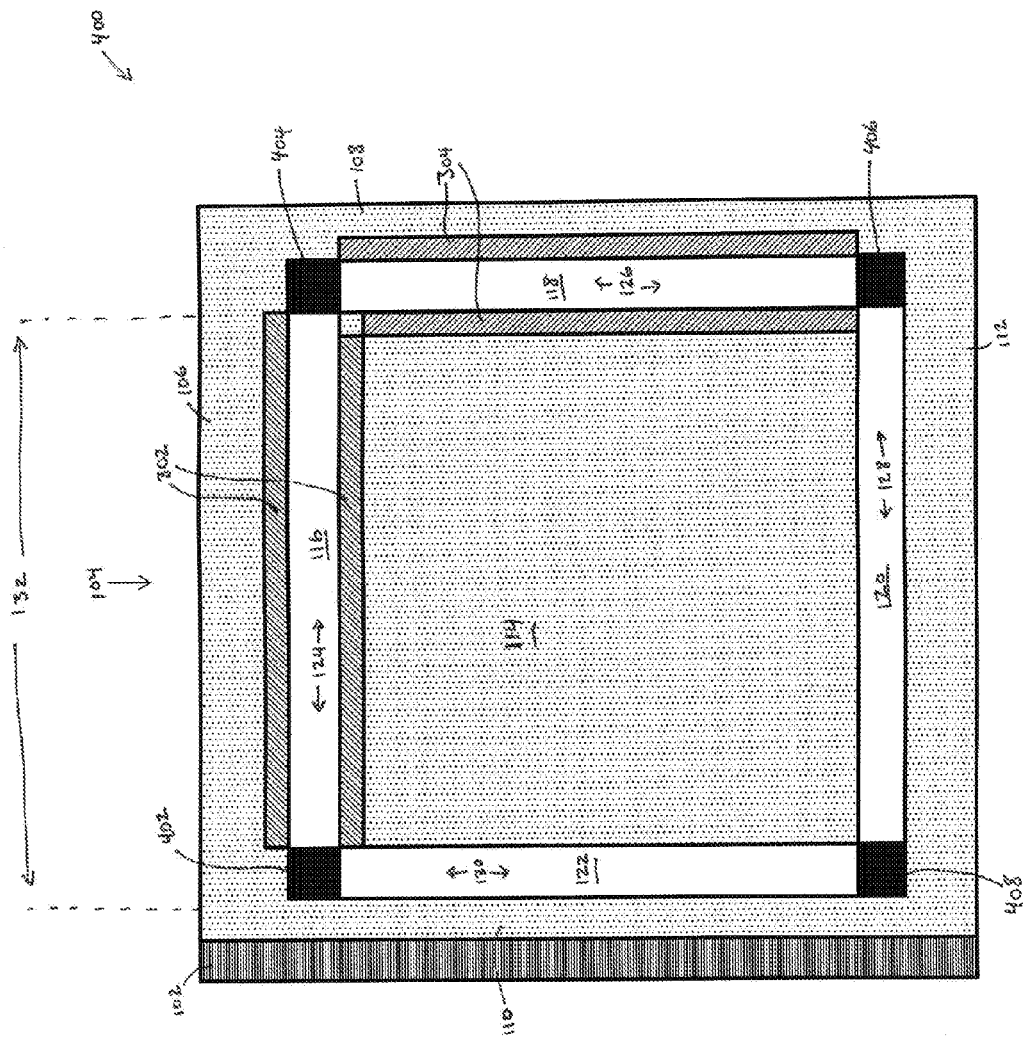
FIG. 4 is a side view of another exemplary display pixel.

FIG. 4 is a side cross-sectional view of another exemplary display pixel 400. Unless otherwise specified, display pixel 400 is similar to display pixel 300 (shown in FIG. 3) and similar components are labeled in FIG. 4 with the same reference numerals used in FIG. 3.

In an exemplary embodiment, display pixel 400 includes a plurality of movable plugs positioned within the fluid channels to facilitate moving the fluids through the channels. More specifically, in one embodiment, display pixel 400 includes a first plug 402, a second plug 404, a third plug 406, and a fourth plug 408. Alternatively, any suitable number of plugs may be used within display pixel 400. In an exemplary embodiment, the plugs are manufactured from a metal or a metallic material, such as iron. Alternatively, the plugs may be manufactured from any other material that is movable by magnetic fields.

In addition, the plugs are sized to be substantially equal to a height of each fluid channel such that the plugs prevent fluids from moving past the plugs within the fluid channels. Accordingly, as the plugs are moved through the fluid channels, the plugs push the fluids in the direction that the plugs are moved. The plugs may also be coated with a hydrophobic material to facilitate preventing water-based fluids from moving past the plugs during operation.

To move fluids within the fluid channels, display pixel 400 uses magnetic fields generated by first coil 302 and/or second coil 304 to move the plugs, rather than using the magnetic fields to operate directly on the fluids themselves. Accordingly, the fluids may be moved by causing the plugs to move through the fluid channels, and the plugs push the fluids through the fluid channels. The plugs may be moved in a similar fashion as described above with reference to FIG. 3. It should be recognized that in embodiments where only one or two coils are used (such as first coil 302 and/or second coil 304), the coil may be used to move one or more plugs by magnetic fields and the other plugs may be moved by the interstitial pressure of the fluid or fluids moved by the plug. In other respects, display pixel 400 operates similar to display pixel 300 of FIG. 3.

Figure 5:
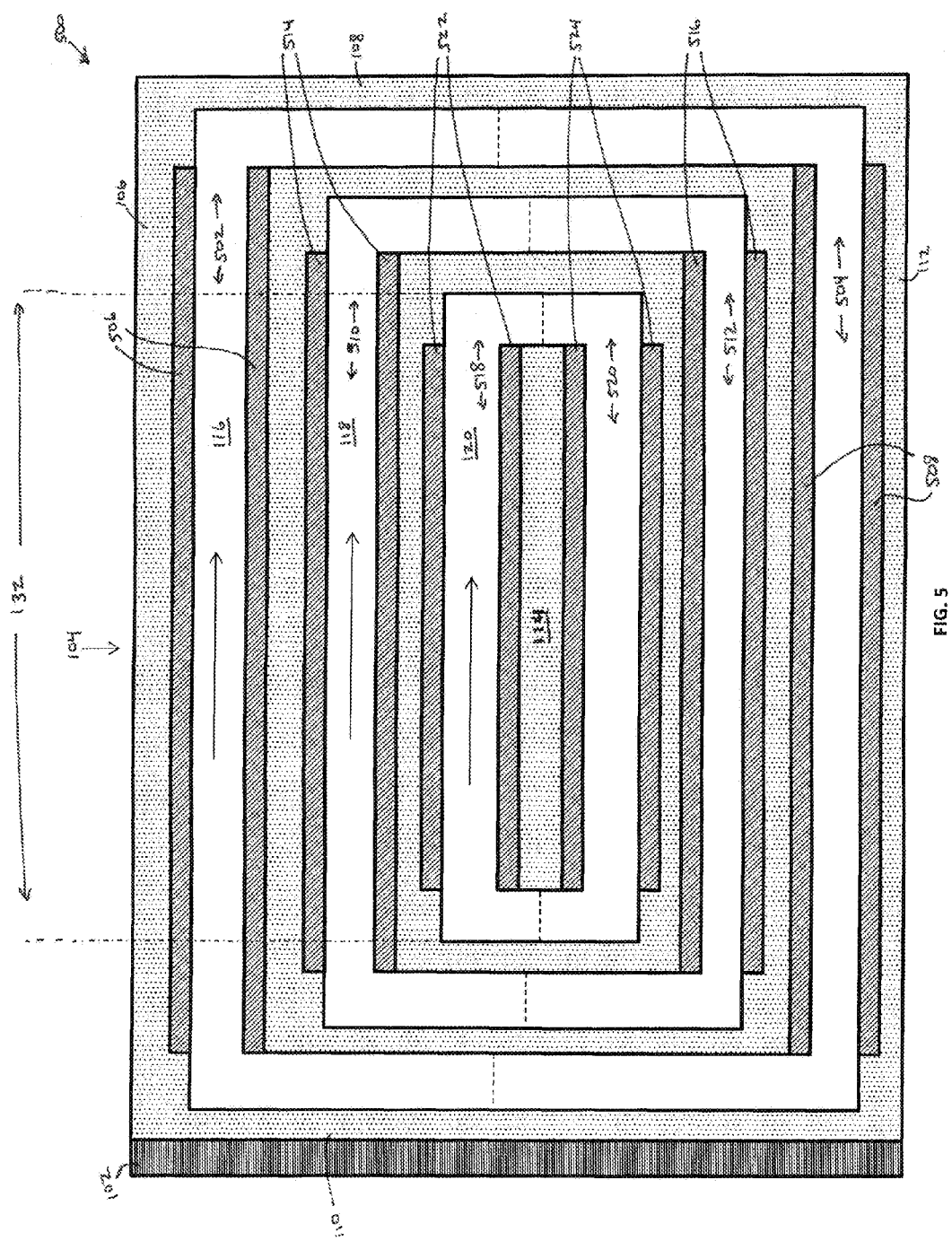
FIG. 5 is a side view of yet another exemplary display pixel.

FIG. 5 is a side cross-sectional view of another exemplary display pixel 500. Unless otherwise specified, display pixel 500 is similar to display pixel 100 (shown in FIG. 1) and similar components are labeled in FIG. 4 with the same reference numerals used in FIG. 1.

In an exemplary embodiment, display pixel 500 includes first fluid channel 116, second fluid channel 118, and third fluid channel 120 arranged concentrically with respect to each other about inner structure 114. Each fluid channel may include two separate fluids having approximately the same volume but having different colors or color characteristics. In an exemplary embodiment, each fluid channel includes one fluid having a predetermined color characteristic to cause a predetermined color to be displayed, and another fluid having a transparent color characteristic (i.e., a color that is substantially transparent). Moreover, the colored fluids within each fluid channel are different from each other to enable display pixel 500 to provide a desired color scheme, such as a cyan-magenta-yellow (CMY) color scheme. Additionally, an electrode at the lowest visible position of display pixel 500 (i.e., an electrode coupled to the top portion of inner structure 114) may be colored black or white to enable display pixel 500 to provide a cyan-magenta-yellow-key (CMYK) color scheme with the key being either black or white as desired. Alternatively, each fluid channel may include any suitable fluids and/or any suitable number of fluids as desired.

The following example illustrates display pixel 500 that provides a CMYK color scheme, although any suitable color scheme may be provided. Moreover, the example described herein uses electrowetting principles to move the fluids around the fluid channels in a similar manner as described above with reference to FIG. 1. However, it should be recognized that the electrodes may be replaced with coils to enable the fluids to be magnetically moved in a similar manner as described above with reference to FIG. 3 and/or FIG. 4. In addition, a combination of electrodes and coils may be used to move the fluids using both electrowetting principles and magnetic fields.

In an exemplary embodiment, first fluid channel 116 forms an outer ring of display pixel 500. First fluid channel 116 includes a first fluid 502 having a cyan color and includes a second fluid 504 that is substantially transparent. First fluid 502 and second fluid 504 have approximately the same volume and are substantially immiscible such that the fluids do not mix as the fluids are transported around first fluid channel 116. For example, first fluid 502 may be a water-based fluid and second fluid 504 may be an oil-based fluid. In addition, in this example, first fluid 502 is acted upon by a first electrode group 506 and/or a second electrode group 508 to move first fluid 502 through first fluid channel 116 by electrowetting principles. Second fluid 504 is moved or pushed through first fluid channel 116 by the interstitial pressure between first fluid 502 and second fluid 504. However, it should be recognized that second fluid 504 may be selected to be a fluid that is movable by electrowetting principles instead of, or in addition to, first fluid 502.

The electrode groups described herein include an outer source electrode and an inner ground electrode that operate similarly to the electrodes described in FIG. 1. As used herein, "outer" refers to a distance or position that is further from inner structure 114, and "inner" refers to a distance or position that is closer to inner structure 114.

If a cyan color is desired to be displayed to a viewer, first fluid 502 is moved into a viewable area 132 of first fluid channel 116 (i.e., an area between the electrodes of first electrode group 506) and second fluid 504 is moved out of viewable area 132 (i.e., an area between the electrodes of second electrode group 508). On the other hand, if viewable area 132 of first fluid channel 116 is desired to be transparent, second fluid 504 is moved into viewable area 132 and first fluid 502 is moved out of viewable area 132. It should be recognized that different shades of cyan may also be displayed to the viewer by controlling first electrode group 506 and/or second electrode group 508 to include a portion of first fluid 502 and a portion of second fluid 504 within viewable area 132 in a similar manner as described above.

Second fluid channel 118 forms a middle ring of display pixel 500 that is disposed between first fluid channel 116 and third fluid channel 120. Second fluid channel 118 includes a third fluid 510 having a magenta color and includes a fourth fluid 512 that is substantially transparent. Third fluid 510 and fourth fluid 512 have approximately the same volume and are substantially immiscible such that the fluids do not mix as the fluids are transported around second fluid channel 118. For example, third fluid 510 may be a water-based fluid and fourth fluid 512 may be an oil-based fluid. In addition, in this example, third fluid 510 is acted upon by a third electrode group 514 and/or a fourth electrode group 516 to move third fluid 510 through second fluid channel 118 by electrowetting principles. Fourth fluid 512 is moved or pushed through second fluid channel 118 by the interstitial pressure between third fluid 510 and fourth fluid 512. However, it should be recognized that fourth fluid 512 may be selected to be a fluid that is movable by electrowetting principles instead of, or in addition to, third fluid 510.

If a magenta color is desired to be displayed to the viewer, third fluid 510 is moved into viewable area 132 of second fluid channel 118 (i.e., an area between the electrodes of third electrode group 514) and fourth fluid 512 is moved out of viewable area 132 (i.e., an area between the electrodes of fourth electrode group 516). On the other hand, if viewable area 132 of second fluid channel 118 is desired to be transparent, fourth fluid 512 is moved into viewable area 132 and third fluid 510 is moved out of viewable area 132. It should be recognized that different shades of magenta may also be displayed to the viewer by controlling third electrode group 514 and/or fourth electrode group 516 to include a portion of third fluid 510 and a portion of fourth fluid 512 within viewable area 132 in a similar manner as described above.

Third fluid channel 120 forms an inner ring of display pixel 500. Third fluid channel 120 includes a fifth fluid 518 having a yellow color and includes a sixth fluid 520 that is substantially transparent. Fifth fluid 518 and sixth fluid 520 have approximately the same volume and are substantially immiscible such that the fluids do not mix as the fluids are transported around third fluid channel 120. For example, fifth fluid 518 may be a water-based fluid and sixth fluid 520 may be an oil-based fluid. In addition, in this example, fifth fluid 518 is acted upon by a fifth electrode group 522 and/or a sixth electrode group 524 to move fifth fluid 518 through third fluid channel 120 by electrowetting principles. Sixth fluid 520 is moved or pushed through third fluid channel 120 by the interstitial pressure between fifth fluid 518 and sixth fluid 520. However, it should be recognized that sixth fluid 520 may be selected to be a fluid that is movable by electrowetting principles instead of, or in addition to, fifth fluid 518.

If a yellow color is desired to be displayed to the viewer, fifth fluid 518 is moved into viewable area 132 of third fluid channel 120 (i.e., an area between the electrodes of fifth electrode group 522) and sixth fluid 520 is moved out of viewable area 132 (i.e., an area between the electrodes of sixth electrode group 524). On the other hand, if viewable area 132 of third fluid channel 120 is desired to be transparent, sixth fluid 520 is moved into viewable area 132 and fifth fluid 518 is moved out of viewable area 132. It should be recognized that different shades of yellow may also be displayed to the viewer by controlling fifth electrode group 522 and/or sixth electrode group 524 to include a portion of fifth fluid 518 and a portion of sixth fluid 520 within viewable area 132 in a similar manner as described above.

It should be recognized that the electrodes of first electrode group 506 and second electrode group 508 are transparent to enable light entering display pixel 500 through viewable area 132 to penetrate through first fluid channel 116 and second fluid channel 118. In addition, an outer electrode of third electrode group 514 is transparent to enable the light to penetrate through third fluid channel 120. In contrast, an inner electrode of third electrode group 514 (i.e., the electrode coupled to or positioned within inner structure 114) may be colored black or white (or may be reflective to appear white) such that light reaching inner structure will be substantially absorbed or reflected, respectively. In such a manner, the inner electrode may provide a black or a white color (or a "key" color) to complement the colors displayed by first fluid channel 116, second fluid channel 118, and third fluid channel 120.

The fluid channels, and the fluids disposed therein, cooperate to form a subtractive color scheme. For example, if a cyan colored fluid (e.g., first fluid 502) is positioned within viewable area 132 of first fluid channel 116, red light is absorbed from light entering display pixel 500. If a magenta colored fluid (e.g., third fluid 510) is positioned within viewable area 132 of second fluid channel 118, green light is absorbed from the light entering display pixel 500. Similarly, if a yellow colored fluid (e.g., fifth fluid 518) is positioned within viewable area 132 of third fluid channel 120, blue light is absorbed from the light entering display pixel 500. Moreover, controllable amounts or ratios of the fluids of each fluid channel may be positioned within viewable area 132 to provide different shades of colors to the viewer. In the absence of power to display pixel 500, the fluids remain in their positions as described above with reference to FIG. 1. As such, a multistable CMYK color scheme, or any other color scheme, may be provided by display pixel 500.

Figure 6:
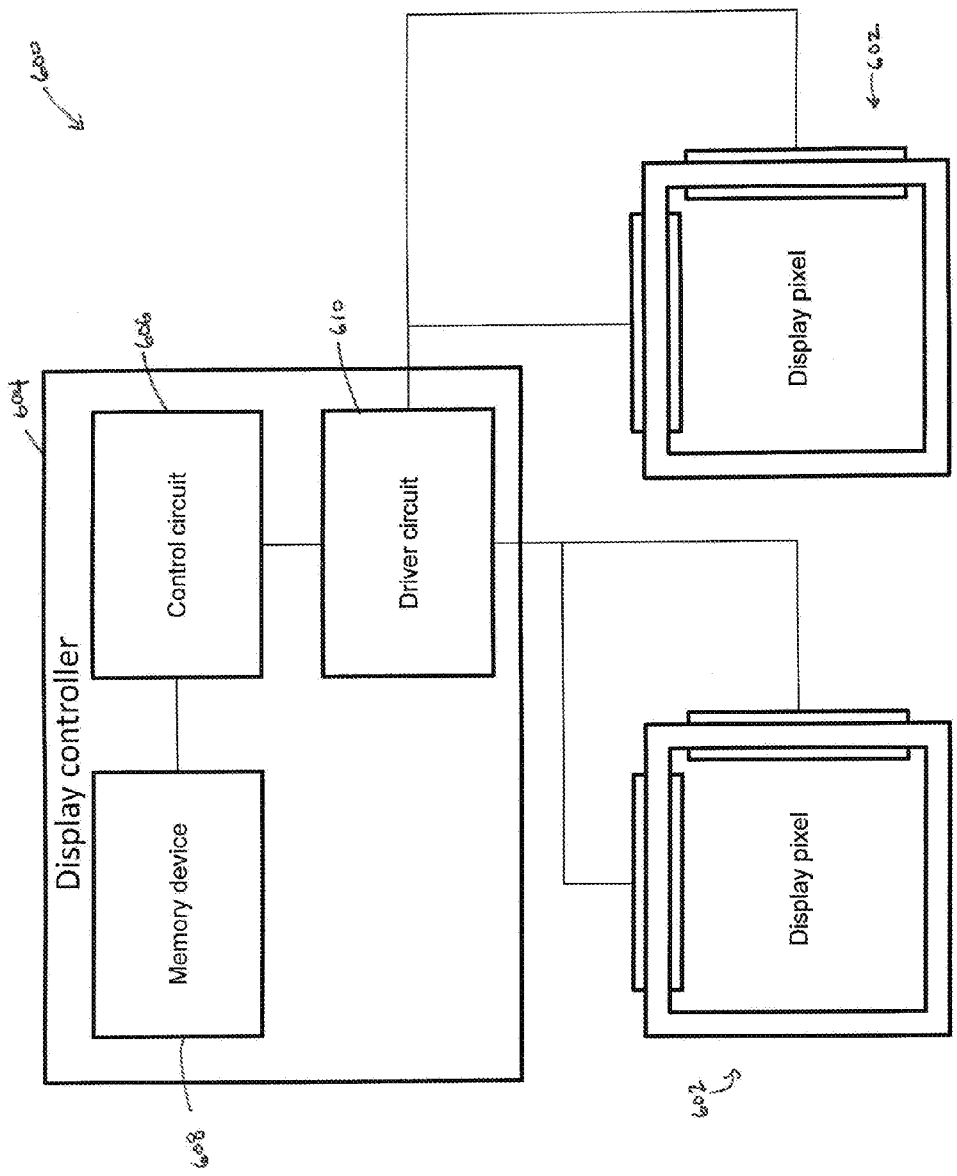
FIG. 6 is a block diagram of an exemplary display system that may be used with the display pixels shown in FIGS. 1-5.

FIG. 6 is a block diagram of an exemplary display system 600. In an exemplary embodiment, display system 600 includes a plurality of display pixels 602 and a display controller 604 coupled to display pixels 602. While two display pixels 602 are illustrated in FIG. 6, it should be recognized that any number of display pixels 602 may be coupled to display controller 604. Display pixels 602 may be display pixels 100, 200, 300, 400, or 500, or any combinations thereof.

In an exemplary embodiment, display controller 604 includes a control circuit 606, a memory device 608, and a driver circuit 610. Memory device 608 and driver circuit 610 are coupled to control circuit 606. In an exemplary embodiment, one or more transistors (not shown) are coupled to, or included within, each display pixel 602 to enable control circuit 606 and driver circuit 610 to select (or address) and control each display pixel 602. The selection and control of each display pixel 602 may be accomplished in a similar manner as LCD and display technologies known in the art, for example.

Control circuit 606 includes any suitable programmable circuit including one or more microcontrollers, microprocessors, reduced instruction set circuits (RISC), application specific integrated circuits (ASIC), programmable logic circuits (PLC), field programmable gate arrays (FPGA), and any other circuit capable of executing the functions described herein. In an exemplary embodiment, control circuit 606 is used to control display pixels 602 to display a selected image or color.

Memory device 608 includes a computer readable storage medium, such as, without limitation, random access memory (RAM), flash memory, and/or any suitable memory. In the exemplary embodiment, memory device 608 includes data and/or instructions that are executable by control circuit 606 to enable control circuit 606 to perform the functions described herein. Additionally or alternatively, memory device 608 may be used to store data representative of a desired image or color to be displayed using display pixels 602 and/or may be used to store data representative of a current state of display pixels 602, such as a color currently displayed by each display pixel 602.

Driver circuit 610 is used to adjust a voltage and/or a current provided to display pixels 602. For example, driver circuit 610 may increase a voltage provided by control circuit 606 to a level needed to activate display pixels 602 to change the color or colors displayed by display pixels 602. In one embodiment, control circuit 606 provides a voltage approximately equal to 5 volts (V) and display pixels 602 are supplied with, or are "driven" by, a voltage approximately equal to 15 V. Alternatively, control circuit 606 may provide a voltage of about 3.3 V or any other suitable voltage higher or lower than 5 V. Likewise, display pixels 602 may be supplied with a voltage within a range between about 10 V and about 20 V inclusive, or any other voltage above or below 15 V. Driver circuit 610 is coupled to the electrodes (e.g., source and drain electrodes) or coils of each display pixel 602 to provide the desired voltage to each display pixel 602. Driver circuit 610 and control circuit 606 may select or address each individual display pixel 602 to separately control each display pixel 602 using any suitable addressing scheme known in the art.

In one embodiment, display pixels 602 are arranged in a matrix of pixels that are individually controlled by display controller 604 (i.e., control circuit 606 and driver circuit 610). Accordingly, each display pixel 602 is controlled to display a color corresponding to a portion of the image or color selected to be displayed by display controller 604.

Figure 7:
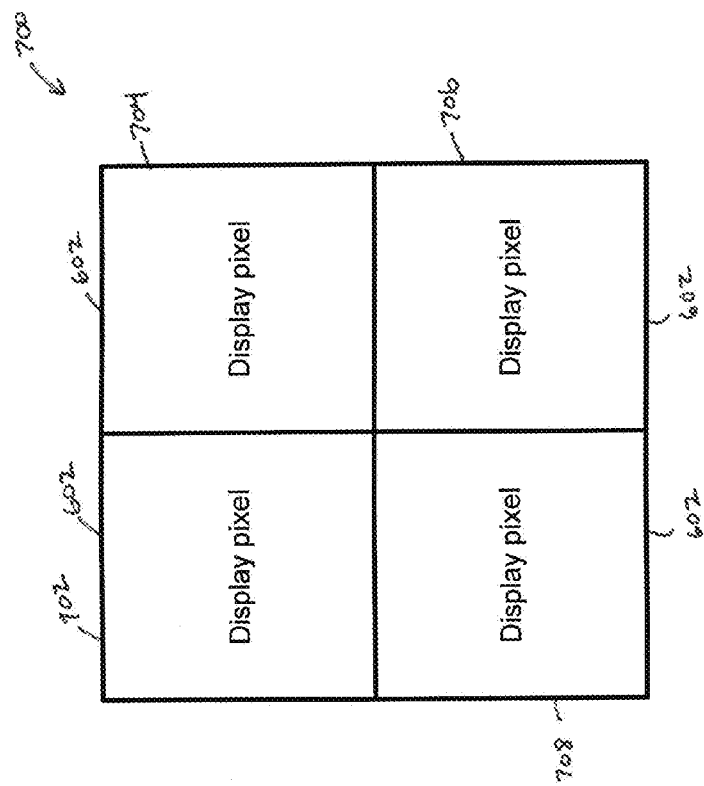
FIG. 7 is a block diagram of an exemplary macro pixel that may be used with the display system shown in FIG. 6.

FIG. 7 is a block diagram of a grouping of pixels (referred to herein as a "macro pixel 700). While FIG. 7 illustrates macro pixel 700 as including four display pixels 602, it should be recognized that macro pixel 700 may include any suitable number of display pixels 602 as desired.

In an exemplary embodiment, macro pixel 700 is an optimized arrangement of display pixels 602 that facilitates providing a uniform display of the display pixels 602 used to display an image. If display pixels 602 include display pixels 500 (shown in FIG. 5) that are used to display an image, the color provided by third fluid 128 (e.g., yellow in the example described in FIG. 5) may appear muted as compared to the color provided by first fluid 124 (e.g., cyan) because light may be absorbed or diffracted as the light travels through the fluid channels and layers above third fluid 128. As a result, the color provided by third fluid 128 within third fluid channel 120 may appear "washed out" or lacking intensity.

To correct for this potential undesirable effect, display pixels 500 within macro pixel 700 may each have a different arrangement of colored fluids within the respective fluid channels. For example, 3 display pixels 500 (shown in FIG. 5) may be arranged in macro pixel 700 such that a first display pixel 702 has colors arranged as colors 1-2-3 (e.g., cyan, magenta, yellow) from top to bottom (e.g., from first fluid channel 116 to third fluid channel 120). Likewise, a second display pixel 704 may have colors arranged as colors 2-3-1 (e.g., magenta, yellow, cyan) from top to bottom, and a third display pixel 706 may have colors arranged as colors 3-1-2 (e.g., yellow, cyan, magenta) from top to bottom. Additionally, first display pixel 702, second display pixel 704, and third display pixel 706 may have a bottom electrode (i.e., the inner electrode of third electrode group 514 described in FIG. 5) that is reflective or colored white. A fourth display pixel 708 may have one fluid colored white (e.g., first fluid 124 within first fluid channel 116) and may have a second fluid colored black (e.g., second fluid 126 within second fluid channel 118) to facilitate displaying white or black colors within macro pixel 700.

Alternatively, display pixels 602 may be arranged having any colors in any suitable alternating order. Accordingly, macro pixel 700 may facilitate evening out an intensity of the colors displayed by display pixels 602 where otherwise the third color and/or the second colors may have a lower intensity by virtue of being positioned beneath the first color in display pixels 500. It should be recognized that macro pixel 700 may be controlled as a whole by display controller 604 (shown in FIG. 6) or each display pixel 602 may be controlled separately within macro pixel 700 by display controller 604.

Figure 8:
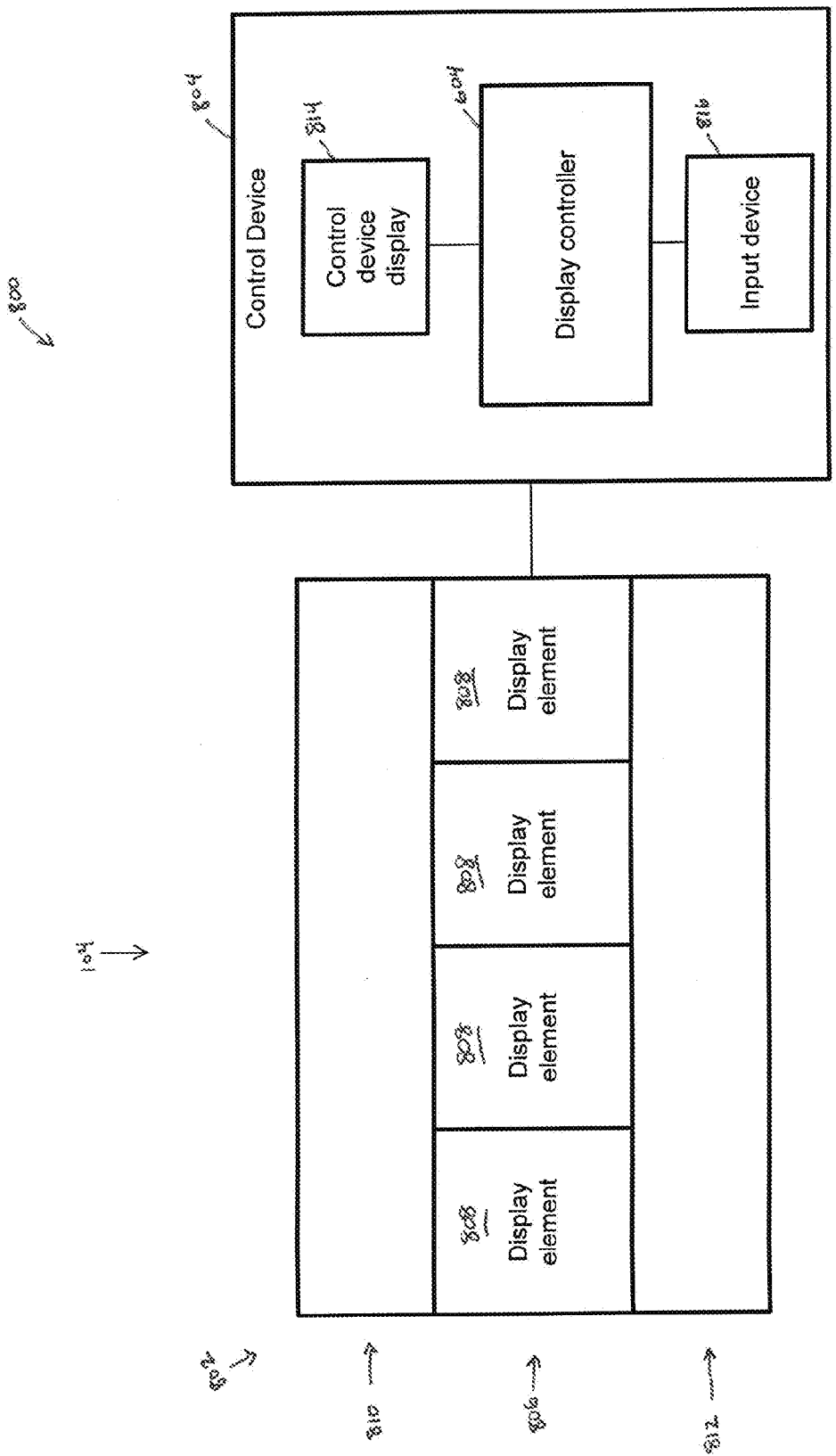
FIG. 8 is a block diagram of an exemplary display system that may be used with the pixels and system shown in FIGS. 1-7.

FIG. 8 is a block diagram of an exemplary display system 800. Display system 800 includes a display 802 and a control device 804 for controlling display 802. In one embodiment, display 802 is used as a cover or "skin" for a device, such as a cell phone, a tablet computing device, an e-reader, or the like. Alternatively, display 802 may be used to cover any device, wall, component, material, appliance, or any other surface. Display 802 may be used to provide a multistable full color covering that enables a user to change a color, image, or text displayed on display 802 as described more fully herein. While the example described herein is directed to a cell phone cover, it should be recognized that display 802 may be used with any suitable object as desired.

In an exemplary embodiment, display 802 includes one or more layers of material. For example, display 802 includes a display layer 806 that includes a plurality of display elements 808. In an exemplary embodiment, display elements 808 are display pixels 602 and/or macro pixels 700 that are arranged in a fully addressable matrix as described above. Display layer 806, and display elements 808 included therein, may be controlled to present any image, color, and/or text to a viewer.

Display 802 may also include a top protective layer 810 positioned on the top of display layer 806 (i.e., between display layer 806 and the viewer looking at display 802 from direction of view 104) and a bottom protective layer 812 positioned on the bottom of display layer 806 (i.e., the side of display layer 806 facing away from the viewer with respect to direction of view 104). In an exemplary embodiment, top protective layer 810 is transparent to visible light to enable the viewer to see display layer 806 through top protective layer 810. Bottom protective layer 812 is hidden from the viewer by display layer 806 during normal operation, so bottom protective layer 812 is not required to be transparent (although it may be transparent in some embodiments). It should be recognized that one or more of the layers (except display layer 806) may be omitted from display 802.

Top protective layer 810 is manufactured from a material selected to provide scratch and impact resistance to display. In one embodiment, top protective layer 810 is manufactured from a transparent silicone or silicone-based material. In another embodiment, top protective layer 810 is manufactured from a transparent plastic material, a transparent polycarbonate material, or any combination of the aforementioned materials. It should be recognized that the examples are illustrative only, and other suitable materials may be used instead or in addition to the enumerated materials. In an exemplary embodiment, an ultraviolet (UV) absorbent material, such as UV absorbent particulates or one or more dyes, is entrained within top protective layer 810 to absorb at least some of the ultraviolet light entering display 802. In one embodiment, the UV absorbent material may be provided as a film covering all or part of top protective layer 810 (or another suitable layer).

Bottom protective layer 812 may be similar to top protective layer 810 and may be manufactured from the same material or materials. In one embodiment, however, bottom protective layer 812 is not manufactured from a transparent material. In an exemplary embodiment, bottom protective layer 812 is positioned against the surface of the cell phone (or other device) to form a skin or cover for the cell phone such that top protective layer 810 faces the user or viewer of the cell phone during use. Bottom protective layer 812 may be adhesive and/or may be fitted to the contours of the cell phone to enable display 802 to be removably fastened to the cell phone.

In an exemplary embodiment, control device 804 includes display controller 604, a control device display 814 coupled to display controller 604, and an input device 816 coupled to display controller 604. Control device 804 may also include any other suitable component or device to enable control device 804 to operate as described herein. Control device 804 may connect to, and/or control, display 802 through a port (not shown) on display 802 and/or may connect to, and/or control, display through wireless means, such as near field technology or other suitable wireless technologies. In one embodiment, control device 804 is a handheld device that is removably coupled to display 802 by an electrical cable or other suitable means. Alternatively, control device 804 may be a desktop computer or any other suitable device.

Control device display 814 may be used to display a user interface to a user to enable the user to operate control device 804. For example, control device display 814 may present a plurality of colors and/or images to the user to be displayed by display elements 808 (e.g., display pixels 602 and/or macro pixels 700). As such, control device 804 can be thought of as transferring the selected colors and/or images to display 802 and/or display elements 808 so that display elements 808 display the colors and/or images to a viewer. Control device display 814 may include, for example, a liquid crystal display (LCD), a vacuum fluorescent display (VFD), a plasma display, a light-emitting diode (LED) display, one or more LEDs, and/or any suitable visual output device capable of displaying graphical data and text to a user.

Input device 816 may include, for example, a keyboard, a keypad, a touch-sensitive screen, a mouse, a scroll wheel, a pointing device, an audio input device employing speech-recognition software, and/or any suitable device that enables a user to input data into control device 804 and/or retrieve data from control device 804.

During operation, one or more colors and/or images may be displayed to the user on control device display 814. The user may select a color or an image (or more than one color and/or image) using input device 816. Display controller 604 may store data representative of the selected color and/or image in memory device 608 (shown in FIG. 6). Control circuit 606 and driver circuit 610 (both shown in FIG. 6) select or address each display element 808 in display 802 and control each display element 808 to cause each display element 808 to display a color or combination of colors that cause the selected color and/or image to be displayed to the viewer. Once each display element 808 displays the desired color to cause the selected color or image to be displayed, power may be removed from display 802 until a new color or image is selected to be displayed on display 802. When power is removed, each display element 808 continues to display the respective color using the fluids within the fluid channels as described above. Accordingly, an image or color may be displayed on display 802 using a small amount of power (as compared to known LCD and LED technologies) and the image or color may be maintained without using any power.

In some embodiments, power may be supplied to display pixels 602 and/or display elements 808 through one or more batteries or other electrical storage elements coupled to display pixels 602 and/or display elements 808, and/or through another device, such as display controller 604 and/or control device 804. For example, if display pixels 602 and/or display elements 808 are incorporated into a device cover, such as a cell phone cover, one or more batteries or other electrical storage elements may be incorporated into the cover to provide power to display pixels 602 and/or display elements 808. Alternatively or additionally, the device cover (and display pixels 602 and/or display elements 808) may be electrically coupled to a power output connection of the cell phone or other device to receive power from the cell phone or other device. In one embodiment, display pixels 602 and/or display elements 808 may receive power through a connection to control device 804.

As described herein, a plurality of electrofluidic display pixels are provided. In some embodiments, the display pixels may be incorporated into a display or into a cover for a device, such as a cell phone cover or a cover for another mobile device. The display pixels include a plurality of fluid channels, and each fluid channel includes at least one fluid configured to display a selected color to a viewer. The display pixels use one or more circuit elements, such as one or more electrodes, conductive coils, or the like, to transport the fluids through the fluid channels using electrowetting technology and/or magnetic fields. When the fluids are transported into a viewable area of the display pixel, the color or color characteristic of the fluids are displayed to the viewer. The fluids retain their position when power is removed so that each display pixel maintains the display of the color or colors to the viewer without requiring any power. Accordingly, the display pixels may be used to provide selected colors or images to a viewer using a subtractive color scheme, or any other color scheme, while only requiring power to be used to change the display pixels to display another color or image.

Exemplary embodiments of a display pixel and a device cover are described above in detail. The display pixel and device cover are not limited to the specific embodiments described herein, but rather, components of the display pixel and/or device cover may be utilized independently and separately from other components and/or steps described herein. For example, the display pixel may also be used with other display technologies and devices, and is not limited to practice with only the device cover as described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to describe embodiments of the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device cover comprising:
   a protective layer; and
   a display layer comprising a plurality of display pixels, wherein each display pixel comprises:
      a viewable area that is viewable by a viewer;
      a first fluid channel positioned at least partially within said viewable area, said first fluid comprising a first fluid having a first color characteristic;
      a second fluid channel positioned at least partially below said first fluid channel when said display pixel is viewed from said viewable area, said second fluid channel comprising a second fluid having a second color characteristic; and
      a third fluid channel positioned at least partially below said second fluid channel when said display pixel is viewed from said viewable area, said third fluid channel comprising a third fluid having a third color characteristic.

2. The device cover of claim 1, wherein the first color characteristic causes a first color to be displayed to a viewer and the second color characteristic causes the second fluid to be substantially transparent to the viewer.

3. The device cover of claim 2, wherein each said display pixel further comprises a circuit element configured to cause a second color to be displayed to the viewer when said second fluid is in a viewable area of said display pixel.

4. The device cover of claim 1, wherein each said display pixel comprises at least one circuit element configured to transport said first fluid and said second fluid through said display pixel.

5. The device cover of claim 4, wherein the first color characteristic causes a first color to be displayed to the viewer when said first fluid is transported into said viewable area.

6. The device cover of claim 5, wherein the second color characteristic causes a second color to be displayed to the viewer when said second fluid is transported into said viewable area.

7. The device cover of claim 6, wherein each said display pixel is configured to maintain the display of the first color and the display of the second color without using electrical or magnetic energy.

8. The device cover of claim 1, wherein each said display pixel comprises at least one electrode group configured to transport said first fluid and said second fluid through said display pixel using an electrical charge.

9. The device cover of claim 1, wherein each said display pixel comprises at least one conductive coil configured to transport said first fluid and said second fluid through said display pixel using a magnetic field.

10. The device cover of claim 1, wherein said first fluid channel is coupled to said second fluid channel such that said first fluid is able to be transported into said second fluid channel and said second fluid is able to be transported into said first fluid channel.

11. The device cover of claim 1, wherein said first fluid channel is positioned concentrically about said second fluid channel.

12. The device cover of claim 11, wherein said first fluid channel and said second fluid channel are configured to enable the viewer to view said first fluid and said second fluid at the same time within said viewable area.

13. A display pixel comprising:
a viewable area that is viewable by a viewer;
a first fluid channel positioned at least partially within said viewable area, said first fluid comprising a first fluid that causes a first color to be displayed to the viewer;
a second fluid channel positioned at least partially below said first fluid channel when said display pixel is viewed from said viewable area, said second fluid channel comprising a second fluid that causes a second color to be displayed to the viewer;
a third fluid channel positioned at least partially below said second fluid channel when said display pixel is viewed from said viewable area, said third fluid channel comprising a third fluid that causes a third color to be displayed to the viewer; and
at least one circuit element configured to transport said first fluid, said second fluid, and said third fluid through said display pixel.

14. The display pixel of claim 13, wherein said viewable area causes the first color to be displayed to the viewer when said first fluid is transported into said viewable area, said second color to be displayed to the viewer when said second fluid is transported into said viewable area, and said third color to be displayed to the viewer when said third fluid is transported into said viewable area.

15. The display pixel of claim 14, wherein said at least one circuit element comprises at least one electrode group configured to transport said first fluid, said second fluid, and said third fluid into said viewable area.

16. The display pixel of claim 14, wherein said at least one circuit element comprises at least one conductive coil configured to transport said first fluid, said second fluid, and said third fluid into said viewable area using a magnetic field.

17. The display pixel of claim 14, wherein said first fluid channel is configured to maintain the display of the first color, the second color, or the third color without using electrical or magnetic energy when the corresponding one of said first fluid, said second fluid, and said third fluid is positioned within said first fluid channel.

18. The display pixel of claim 13, wherein said at least one circuit element is configured to transport said first fluid into said second fluid channel and to transport said second fluid into said third fluid channel.

\* \* \* \* \*